March 1, 1932.　　　M. P. WINTHER　　　1,848,091
POWER TRANSLATOR
Filed Feb. 21, 1929　　　3 Sheets-Sheet 1
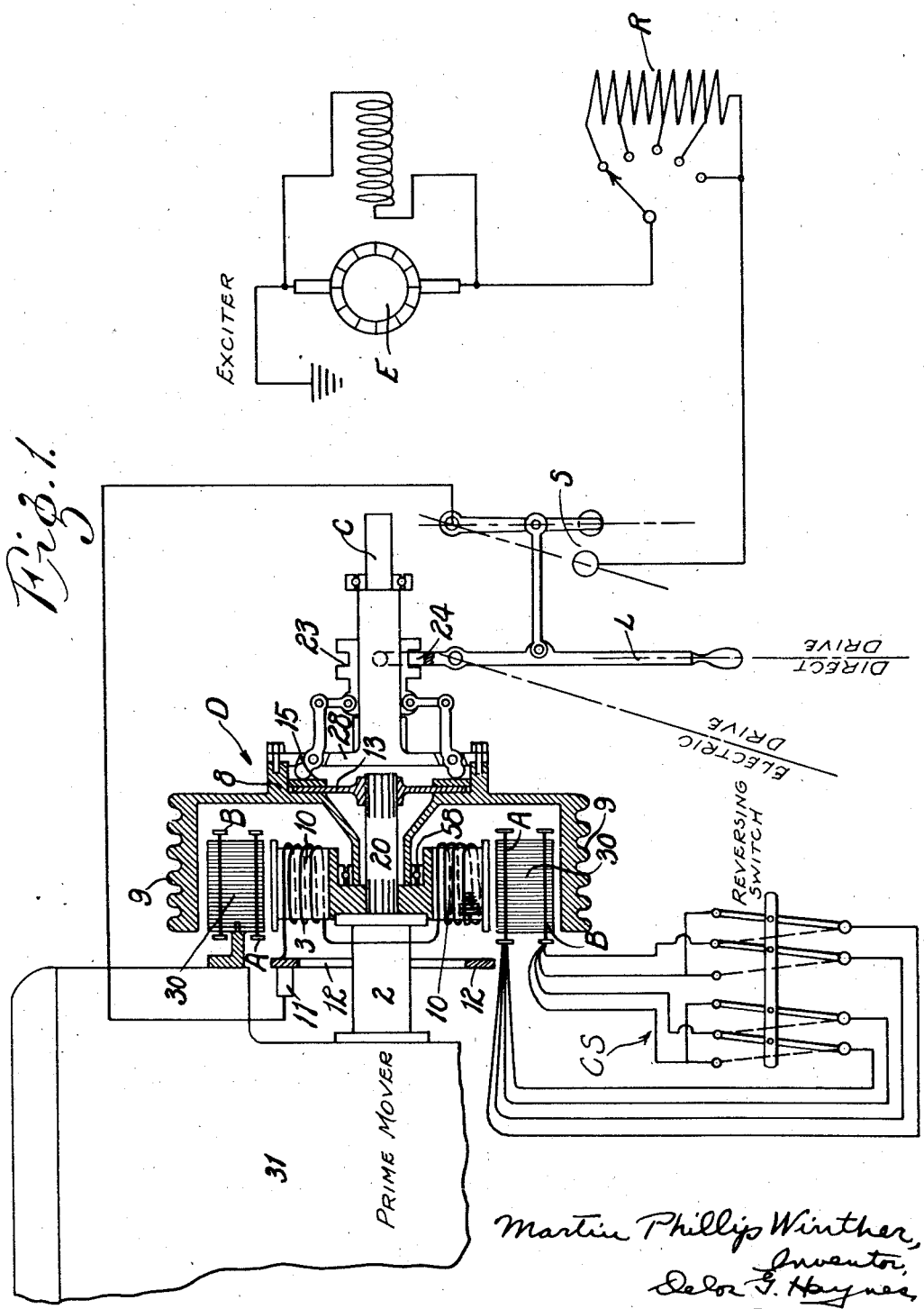

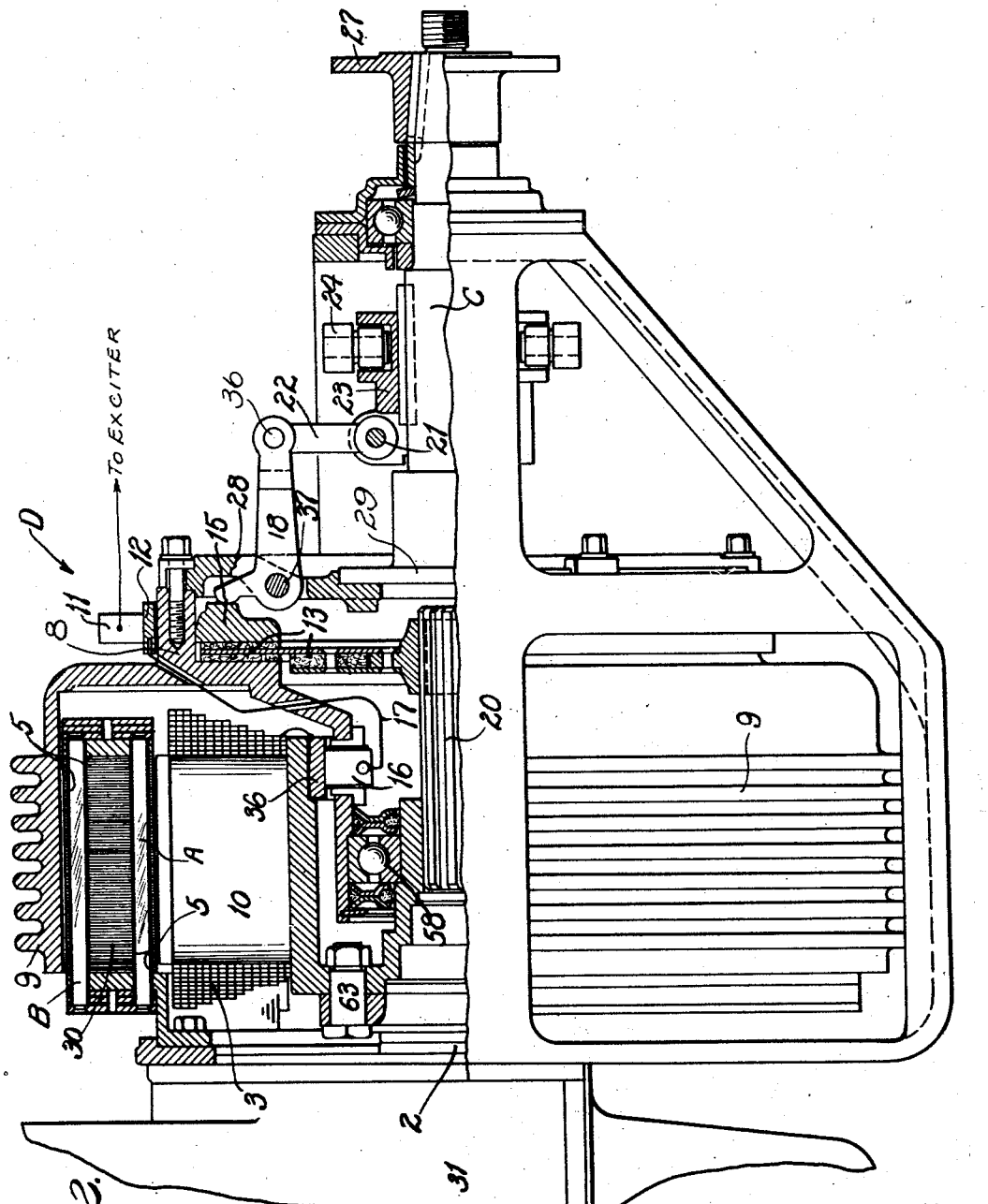

March 1, 1932. M. P. WINTHER 1,848,091
POWER TRANSLATOR
Filed Feb. 21, 1929 3 Sheets-Sheet 3
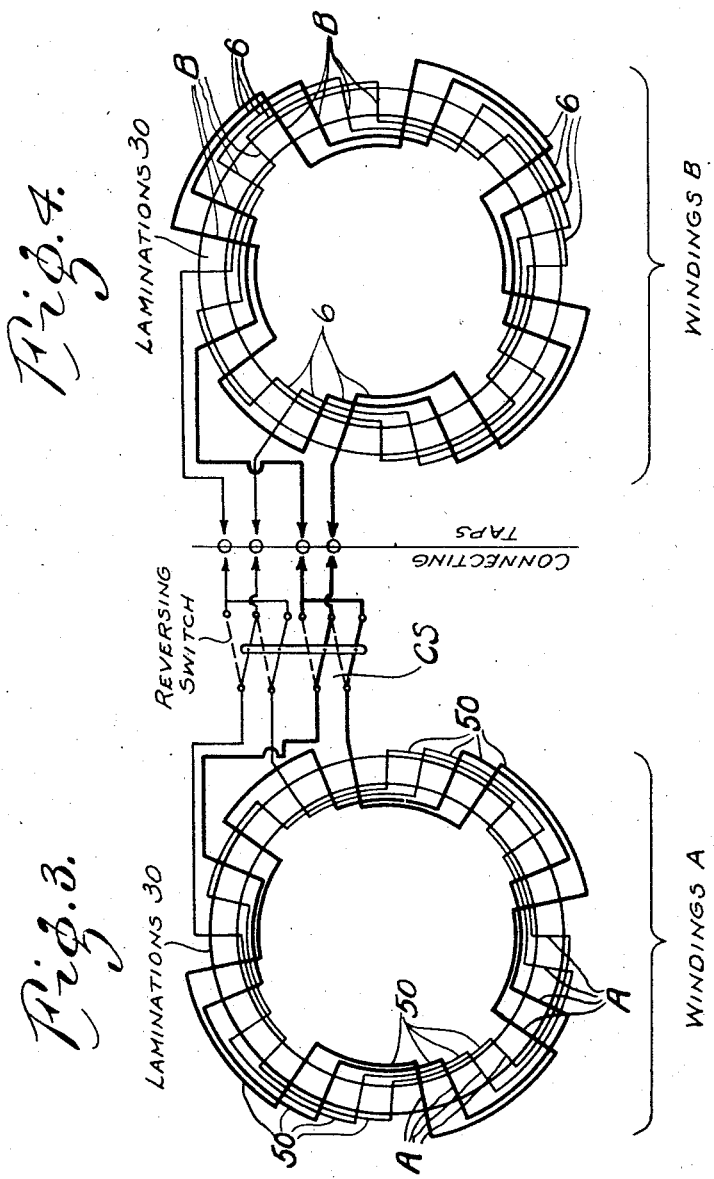

Patented Mar. 1, 1932

1,848,091

UNITED STATES PATENT OFFICE

MARTIN PHILLIP WINTHER, OF CHICAGO, ILLINOIS, ASSIGNOR TO THE WINTHER COMPANY, OF WILMINGTON, DELAWARE, A CORPORATION OF DELAWARE

POWER TRANSLATOR

Application filed February 21, 1929. Serial No. 341,655.

This invention relates to an electrical power translator, and with regard to certain more specific features, to an alternating current power translator for use more especially in marine service and the like, but being applicable also to other purposes.

Among the several objects of the invention may be noted the provision of means for translating power from a prime mover to the driving elements of a conveyance, for instance to the propeller of a ship so as to adapt the effective speed-torque range of the prime mover to the effective speed-torque range imposed on the driving elements, and at the same time provide simplified means for quickly reversing the rotation of said driving elements, wherein electrical means functioning with alternating current is used, so that the advantage is had over a direct current system of eliminating sliding contacts for carrying an electrical power circuit; and the provision of a device of the class described having a short power circuit with a consequent reduction in weight and losses.

Further objects of this invention are the provision of a more efficient drive in certain forward speeds than is obtainable with an electrical transmission, a direct drive being used for forward cruising speeds; the provision of a device of the class described which can be operated in reverse for an indefinite period without over-heating and one which can be thrown into full reverse directly from full speed forward without shock or injury to any part of the connected apparatus.

A further object is to provide a torque reaction, when the device is thrown into reverse from full speed ahead, which is greater than the resisting engine torque under full load, so that the engine shaft is not called upon to take the full torque due to braking, some of the torque reaction being taken up directly on the engine frame instead of being absorbed by the engine crank shaft.

A further object of the invention is to provide for a remote control for the entire maneuvering of a ship, which control is simpler than that obtained with a conventional oil-electric drive and without the complications inherent in the oil-electric drive.

Another object is the provision of a light, inexpensive marine reverse gear of simple construction having all the desirable features of both electrical and mechanical drives and which cannot burn out due to overload, excessive speeds or the like and which is particularly adapted to Diesel engine marine operation.

Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings in which is illustrated one of various possible embodiments of the invention,

Fig. 1 is a diagrammatic side elevation and wiring diagram showing the translator applied to a prime mover;

Fig. 2 is a side elevation, partly in section, showing the translator per se;

Fig. 3 is a wiring diagram of a generator winding; and,

Fig. 4 is a wiring diagram contiguous to that of Fig. 3 showing a connected motor winding.

Similar reference characters indicate corresponding parts throughout the several views of the drawings.

While this device has other applications which may be readily sensed from the description hereinafter, the present explanation, for purposes of clarity, will be referred to in connection with a marine drive for connecting an internal combustion engine, such as a Diesel engine, with a propeller shaft, this being the preferred, though not the only application of the present invention.

On small boats, mechanical reverse gears are fairly satisfactory when power is transmitted through the reverse gearing for only short periods. However on large installations such as large Diesel engine driven boats the mechanical or gear type reverse mechanism is not satisfactory. In fact, on heavy installations, either an electric drive comprising a separate generator and a separate motor is used, or the direct connected engine is provided with a brake for stopping it, and reverse is accomplished by shifting the cam shaft and reversing the engine. Compressed air under 500 or so pounds pressure is usually employed for restarting the engines in reverse. When going full speed ahead and a sudden need arises for reversal, the force of the water acting on the screw makes immediate starting of the engine in reverse direction impossible in many instances. The air system and the cam system are expensive and at best unsatisfactory. Furthermore, the inherent inability of a Diesel engine to function at very low speed relative to normal running makes maneuvering under such conditions difficult.

In many types of reverse gear there must at present be a slip friction engagement for starting the boat in either direction, thereby introducing wear. Furthermore, the conventional electric generator-motor drive, although flexible, is very heavy and expensive and entails a power loss at all times in cruising operation of not less than 20 per cent and usually more. To overcome the objections to both types of marine drives this invention has been developed.

Referring now more particularly to Fig. 1 there is illustrated at 31 a prime mover, such as is ordinarily used in marine construction, that is, one such as a Diesel engine requiring a change in either cam or shaft connections in order to effect a change from forward to reverse action of the vessel which it is driving. The power or crank shaft 2 of this engine is electrically and/or mechanically connected with a propeller shaft C by means of the translator or transmission D, herein to be described.

Broadly, the translator D comprises a multi-pole magnet spider 10 fastened to the power shaft 2 and directly rotatable therewith, this magnet spider 10 carrying an integrally rotatable extension or clutch shaft 20. The clutch shaft 20 has splined thereto a driving male clutch plate 13. Hence it will be seen that the crank shaft 2, magnet spider 10, splined shaft 20 and male clutch plate 13 all rotate as a unit when the prime mover is in operation. Fastened to the frame of the engine 31 is a circularly laminated stator 30. Formed around the stator 30 is a finned rotor 9.

The propeller shaft and associated system C is attached to and rotates with the rotor 9, the latter being piloted with respect to the magnet spider at bearing 58. The rotor 9 includes a driven clutch drum 8 and pressure plate 15 movable therewith. The clutch drum 8 and plate 15 form connectible driven female members for the driving male clutch plate 13.

The above broadly describes the three relatively rotatable and interacting features of the invention, namely, the rotatable magnet spider or rotating field member 10, the rotor 9 and the stator 30, the rotating field member 10 being adapted to be mechanically clutched with the rotor 9 and propeller shaft system C by way of the splined shaft 20 and the clutch 8, 13, 15.

The spider 10 forms a rotating field member for generating alternating current in mechanically separate but electrically connected sets A and B of inductor bars located in the stator 30. The inductor bars A, B are arranged in an improved and novel manner (to be particularly described) for producing a rotating field at the outer surface of the intermediate rotor said field cutting through the rotor 9.

Thus it will be seen that the relative rotation between the magnet member 10 and the stator 30 induces current in the inductors A, B, and these, by means to be set out, set up a magnetic field externally of the stator 30. The result of this external field cutting the rotor 9 is to magnetically drag the rotor 9 and thereby drive the propeller shaft system C, provided that the clutch is open.

The spider 10 may be considered as forming the rotating magnet of a generator attached to the crank shaft 2 of the prime mover 31. The stator 30 may be considered as forming a stationary armature for carrying inner generator inductor windings A which comprise copper bars set in suitable insulating portions 5 of mica or the like. It is to be understood that the stator 30 is suitably laminated as indicated. End links 50 (see Fig. 3) are so connected to the copper bars A that a plurality of phases, two in the present instance, shown by light and heavy lines, are generated in the inner generator inductors A. The said end links are suitably insulated from one another.

The steel laminations of the stator 30 also form the magnetic structure for embedding the primary circuit of that portion of the translator which functions as a motorizing element. The motor winding comprises outer copper bars B and end links 6 (see Fig. 4), similar to bars A and links 50. The windings B form a motor primary which is preferably identical to the windings A in number of bars and phases, the phases being also shown in Fig. 4 by light and heavy lines. Figs. 3 and 4 are positioned contiguously to show the nature of the phase connections between windings A and B. Fig. 1 shows the actual connections.

It will be seen from the above that the rotor 9 functions as a motor secondary concentrically mounted around the stationary laminated generator-motor structure 30. This motor secondary or rotor 9 comprises a plain steel ring secondary in the present embodiment provided with suitable cooling fins, as shown by the drawings. However, it is to be understood that this secondary might have embedded conductors, thus comprising a squirrel cage type of secondary, either single or double. It may be stated that where reverse and maneuvering speeds are not in excess of one-half of that required in forward speeds the plain ring secondary is satisfactory but otherwise a squirrel cage type of ring 9 should be used.

With the above in mind, certain details of the construction will be set out (see Figs. 1 and 2).

The magnet spider 10 includes a separately excited field coil 3 connected with an exciting current collector ring 36, the latter receiving current by way of a separate exciting brush 16 fed from the exciter E. The brush 16 is fed by way of a lead 17 leading from a ring 12 mounted on the clutch casing. A brush 11 supplies the ring 12. The brush 16, lead 17 and ring 12 rotate with the driven elements. The ring 36 rotates with the driving elements. Excitation of the magnet spider 10 by way of said brush 11 is effected from a separate source, either the standard type of lighting generator carried on the prime mover or other suitable known source. Fig. 1 shows exciter E used herein which is connected to the brush 11 by way of a switch S, said switch S being mechanically coupled with a clutch lever L in the manner shown, so that when the clutch is open, the switch S is closed, thereby providing closed connections for electrical driving. On the other hand when the clutch is closed, the switch S automatically opens so that there is no excitation of the rotating field coils 3 and consequently there are then no electrical interactions. This comprises direct drive forward. When the lever L is in electric drive position and the switch S is shut, electrical driving may be effected either forwardly or in reverse depending upon the position of a reversing switch CS located between the circuit of the generator inductors A and the circuit of the motor primary windings B. An adjustable resistance R is place in the exciter circuit for controlling the amount of electrical driving action. Thus the rotating field of the magnet spider is formed when the clutch is open and this field is dissolved whenever the clutch is closed.

It is to be noted that this is not a field due to induction, but is a simple mechanically rotating field emanating from the magnet member 10.

The spider 10 is bolted to the end flange of the engine crank or power shaft B by means of studs 63. It will be noted from Fig. 2 that the rotor 9 extends rearwardly to include the casing 8 of the clutch to which casing 8 is bolted a plate 28 which reaches radially inward and is fastened to a flange 29 associated with the propeller shaft system C.

The clutch is opened and closed by means of a sliding collar 23 splined to the shaft C and operated by a suitable fork 24. Toggle action is effected by means of links 22, 18 and pins 21, 36, 37. The link or bell crank 18 is pinned to the clutch plate 28 and exerts pressure upon the male clutch plate 13 by way of pressure plate 15. The clutch remains in either a predetermined open or closed position because of the overcentering action of the link 22.

As described, when the clutch is engaged, the exciting circuit to the spider 10 is automatically opened and this, it is to be understood, may also be done manually. Under these conditions direct drive is had through the spider 10, splined shaft 20, male clutch plate 13, clutch 8, 28, flange 29, shaft C and flange 27. The rotor 9 at this time is revolving with the remainder of the apparatus.

However, when the clutch is disengaged and the switch S is consequently closed so as to cause excitation of winding 3, then a polyphase current is generated in the inner generator windings A, that is, when the prime mover is operated. The switch gear CS such as shown in Figs. 1 and 3 is used to connect the polyphase windings of the generator with the polyphase motor primary windings B, whereby polyphase current is delivered from the generator windings A (Fig. 3) to the motor windings B (Fig. 4).

It will be apparent from the above that the relation between the phases in the circuits of windings A and B determines the direction of angular motion of the rotating field produced in the windings B and about the stator 30. Hence by throwing the switch CS and reversing the connections at the taps for each of the two phases of the windings A, the effective phase relationship in the connected windings B may be changed so that the direction of rotation of the field moving externally around the stator 30 may be reversed. Inasmuch as this rotating field is the one which effects a drag on the armature or rotor 9, the result is that motion may be produced at the propeller shaft in either direction, depending upon how the switch CS has been thrown. When the switch is thrown to the solid line position shown in Fig. 3, forward rotation is effected (rotation in the direction had when the clutch is closed) and when thrown to the dotted line position reverse rotation is effected. It will be noted that driving is effected from the then magnetically dragged rotor 9 to the propeller shaft by way of the clutch member 28, the clutch flange 29 and the transmission flange 27. The above action is effective only when the clutch is open and the exciter circuit closed.

It is clear from the above that electrical reversal may be effected by remote control of the switch CS and it is also clear that the clutch lever L can be operated electrically from a remote control or pneumatically, hydraulically or the like. This is especially true when it is noted that the clutch is of the "in-out" type requiring no graduating engagement as in the case of a spring engaged clutch.

It will be understood that no collector rings or brushes are required for making the connections between the inductors A, windings B and switch C, inasmuch as the stator 30 is not rotatable. Hence the connections, illustrated diagrammatically in Fig. 1 may be readily made.

The operation of the translator is as follows:

The prime mover 31 is started while the clutch is open. Thus the crank shaft 2, magnet spider 10, splined shaft 20 and male clutch plate 13 rotate. The resistance R is preferably made high assuming that the exciter E has been started, in order that electrical driving effect may be low.

To start the boat, the reversing switch CS is thrown into forward position, the prime mover 31 is operated at normal speed and the resistance R is gradually cut out, whereupon the load on the propeller shaft system C is gradually picked up and the boat accelerated. Under these conditions the movement of the field about the stator 30 is in the same direction as the movement of the prime mover and of the magnet spider 10. Thus the motor secondary rotor 9 is driven by the magnetic drive in what is known herein as forward direction.

After a suitable speed has been attained under the above conditions the clutch lever L is thrown to the direct drive position shown in solid lines in Fig. 1, whereby the exciter switch S is opened and the clutch closed so that a direct connection is had between the prime 31 and the propeller shaft system C.

If it is desired to stop the boat, the clutch lever L is thrown into electric drive position, whereby the clutch is opened and the exciter circuit thrown into operation. Before, at, or after this operation, the reversing switch CS is thrown into reverse position so as to change the connections between the generator conductors A and the motor primary windings B so that under the same conditions of rotation of the prime mover 31 and the magnet spider 10, the magnetic field around the stator 30 proceeds in the reverse direction to that of the rotation of the motor secondary 9. This provides a magnetic drag in reverse which tends to brake the movement of the propeller shaft system C which is then revolving due to its inertia and the driving action of the water as the boat carries on under its momentum. Thus the propeller system C stops, and if conditions are not changed, will reverse its movement under the action of the reversed magnetic drive on the rotor 9. Hence the momentum of the boat is reduced to zero after which it is accelerated in the reverse direction.

If it is not desired to reverse the movement of the boat, the exciter circuit is opened as the boat comes to a standstill, and/or the prime mover 31 may or may not be stopped.

In marine practice it is not necessary while cruising to increase the torque for driving the screw beyond the torque of the engine. This translator therefore only transmits engine torque while cruising. However, the engine torque is not always sufficient to stop the screw when the boat is in motion. This translator meets this condition, because, if the torque reaction for stopping the screw exceeds the engine torque, the surplus is absorbed in the engine frame by electrical reaction between the stator 30 and rotor 9. This device will provide nearly full engine torque either in forward or reverse direction, either for driving or braking. It may be thrown into full reverse directly from forward without damage to any part. The speed of the screw can be controlled in either direction without changing the engine speed by controlling the resistance R. This control may be remote if desired. The change from one direction of rotation to another of the field around stator 30 is accomplished instantaneously and without shock.

By means of this invention the overall average efficiency in the operation of a boat is increased, because any possible inefficiency, due to electrical driving, occurs only over short intervals of time. A direct and highly efficient mechanical connection is had over the entire cruising periods, which is not possible with the present day conventional electrically driven boats.

Another feature is that a great amount of time is saved in effecting a stop or a reversal of a boat, inasmuch as maximum braking effect is obtainable at all times and no lost motion is had in effecting mechanical connections and/or disconnections.

The term magnet spider is to be understood herein as including any armature construction rotatable from the prime mover shaft which is adapted to mechanically rotate a magnetic field.

The term stator refers to any construction whereby the effect of the mechanically rotated armature field is manipulated so that there is effected an electrically rotatable field. The stator includes part of the generating elements and part of the motorizing elements.

The term rotor refers to the device upon which the electrically rotatable field moving about the stator effects a magnetic drag.

The term clutch refers to any means for mechanically connecting the rotor and armature as these elements are above defined.

This invention broadly relates to the application of Martin P. Winther et al., filed November 28, 1928, Serial Number 321,071, in that both applications have a common member for carrying generating and motorizing elements. In this application, however, said common member comprises a stator inserted for the purpose of controlling the direction of rotation of a magnetic field, whereas in said co-pending application the common member comprises a rotor.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a power translator a prime mover, a magnetic armature rotatable by the prime mover, a stator, a rotor, means for exciting said armature including a switch, means in the stator adapted to be affected by said armature so as to produce a rotating field when the armature is excited, said field magnetically dragging the rotor, an openable clutch connecting the rotor and the armature and means connecting said clutch and said switch whereby one is open when the other is shut.

2. In a power translator a prime mover, a magnetic armature rotatable by the prime mover, a stator, a rotor, means for exciting said armature including a switch, means in the stator adapted to be affected by said armature so as to produce a rotating field when the armature is excited, said field magnetically dragging the rotor, an openable clutch connecting the rotor and the armature, means connecting said clutch and said switch whereby one is open when the other is shut and means for reversing the direction of movement of said rotating field whereby the direction of movement of the rotor may be changed when it is unclutched.

3. In a power translator a prime mover, a magnetic armature rotatable therewith, a stator adjacent the armature and a rotor adjacent the stator, the stator carrying inductor windings adjacent the armature and primary windings adjacent the rotor, said armature inducing polyphase alternating current in the inductors, a switch connection between the inductors and primary windings adapted to transfer current so as to effect a rotating field about the stator forwardly or backwardly, said field magnetically dragging or repulsing the rotor, depending upon the set of said switch, means for variably exciting said armature including a switch adapted when open to prevent excitation, a clutch connecting the rotor and the armature and means connecting said clutch and switch such that when either the clutch or switch is closed the other is open.

In testimony whereof, I have signed my name to this specification this 17th day of February, 1929.

MARTIN PHILLIP WINTHER.